United States Patent
Hsu

[19]

[11] Patent Number: 6,140,736
[45] Date of Patent: Oct. 31, 2000

[54] ANTI-LOOSENING OUTER ROTOR MEANS FOR HIGH-TORQUE OUTER-ROTOR TYPE ELECTRIC MOTOR

[76] Inventor: Chun-Pu Hsu, No. 19, Wu-Chien Sixth Road, Wu-Ku Industrial Park, Wu-Ku, Taipei Hsien, Taiwan

[21] Appl. No.: 09/426,125

[22] Filed: Oct. 22, 1999

[51] Int. Cl.[7] .............................. H02K 1/28; H02K 21/22; H02K 1/27
[52] U.S. Cl. ............................................ 310/261; 310/156
[58] Field of Search ..................................... 310/156, 261, 310/67 A, 267, 153

[56] References Cited

U.S. PATENT DOCUMENTS

| | | | |
|---|---|---|---|
| 3,810,056 | 5/1974 | Jereb | 310/153 |
| 4,423,345 | 12/1983 | Nilsson | 310/153 |
| 5,753,991 | 5/1998 | Couture et al. | 310/156 |

FOREIGN PATENT DOCUMENTS

| | | | |
|---|---|---|---|
| 2641536 | 5/1977 | Germany | H02K 1/28 |
| 9-56092 | 5/1977 | Japan | H02K 1/27 |

*Primary Examiner*—Burton S. Mullins

[57] ABSTRACT

An anti-loosening outer rotor device, adapted for use in an outer-rotor type electric motor, includes: a cylinder member having a plurality of recesses radially recessed in an inside wall of the cylinder member; a magnetic conductor annularly secured to the inside wall of the cylinder member to be circumferentially disposed about an inner stator of the motor and having a plurality of protrusions radially protruding outwardly from the magnetic conductor with each protrusion of the magnetic conductor engaged with each recess of the cylinder member for a firm coupling of the magnetic conductor in the cylinder member for preventing loosening of the magnetic conductor from the cylinder member under high-speed and high-torque rotation; and an end plate secured with the cylinder member for outputing kinetic force of the motor directly from the cylinder member, or for outputing the kinetic force from a driving shaft as axially connected to the cylinder member.

15 Claims, 7 Drawing Sheets

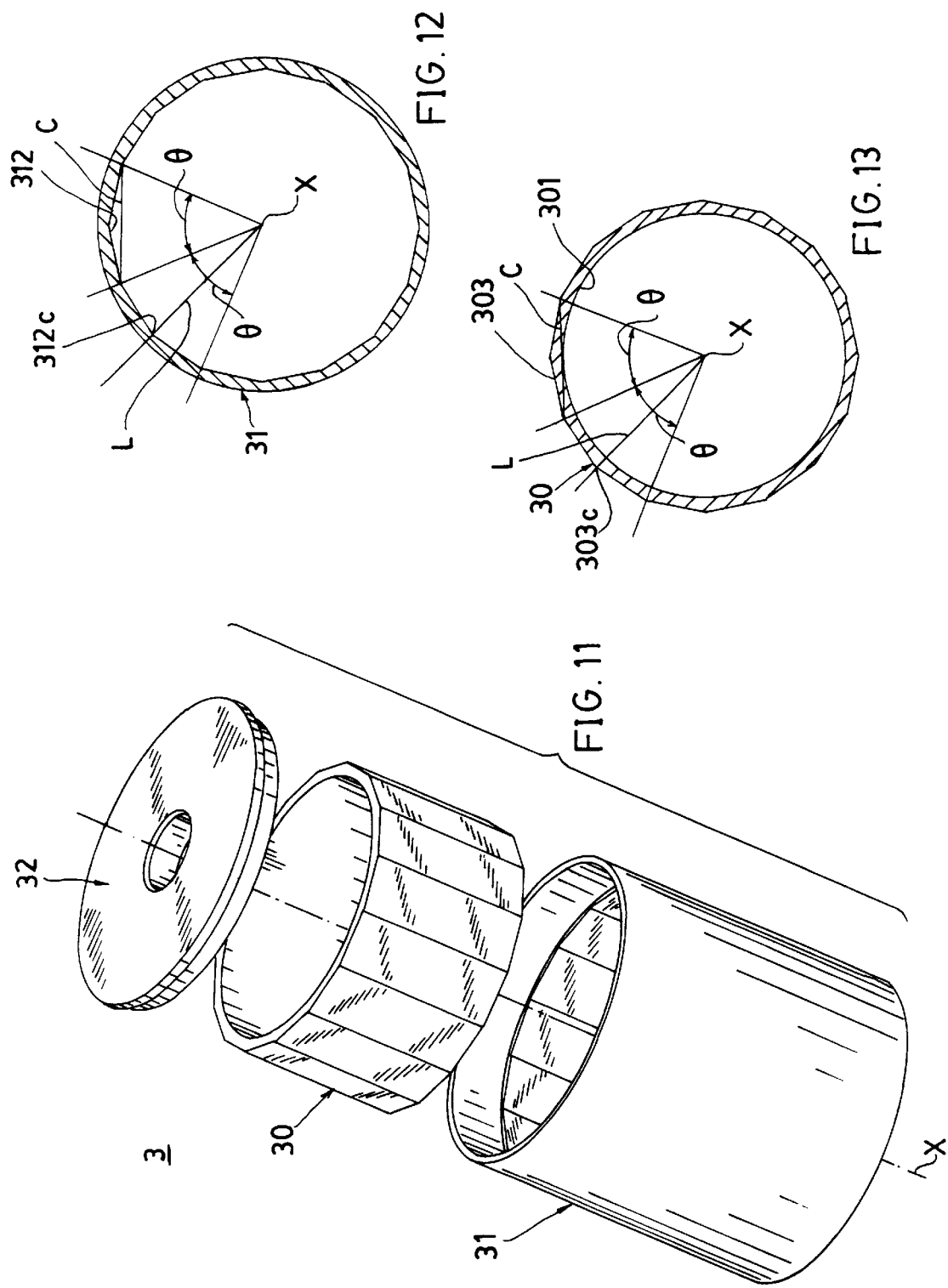

ANTI-LOOSENING OUTER ROTOR MEANS FOR HIGH-TORQUE OUTER-ROTOR TYPE ELECTRIC MOTOR

BACKGROUND OF THE INVENTION

The present invention is an improvement of U.S. patent applications (hereinafter defined as "prior arts") also filed by the same inventor of this application, including U.S. Ser. No.: 09/320,857, filed on: May 26, 1999 and U.S. Ser. No.: 09/329,175, filed on: Jun. 9, 1999, etc.

The prior arts disclosed an outer-rotor type electric motor, as shown in FIG. 16 as accompanied in this application, including: an inner stator 1 fixed on a stator holder 2, and an outer rotor 3 rotatably circumferentially disposed about the inner stator 1 about an axis X. The outer rotor 3 includes: a cylinder member 31 and a magnetic conductor 30 secured to an inside wall of the cylinder member 31, having an interface I cylindrically defined between the magnetic conductor 30 and the cylinder member 31 without intermeshing the conductor 30 and the cylinder member 31. Such a smooth interface I may cause loosening or separation of the magnetic conductor 30 from the cylinder member 31, thereby easily damaging or deteriorating the electric motor.

The present inventor has found the drawbacks of the prior arts and invented the present anti-loosening outer rotor device for an outerrotor type electric motor with high torque output.

SUMMARY OF THE INVENTION

The object of the present invention is to provide an anti-loosening outer rotor device, adapted for use in an outer-rotor type electric motor, including: a cylinder member having a plurality of recesses radially recessed in an inside wall of the cylinder member; a magnetic conductor annularly secured to the inside wall of the cylinder member to be circumferentially disposed about an inner stator of the motor and having a plurality of protrusions radially protruding outwardly from the magnetic conductor with each protrusion of the magnetic conductor engaged with each recess of the cylinder member for a firm coupling of the magnetic conductor in the cylinder member for preventing loosening of the magnetic conductor from the cylinder member under high speed and high torque rotation; and an end plate secured with the cylinder member for outputing kinetic force of the motor directly from the cylinder member, or for outputing the kinetic force from a driving shaft as axially connected to the cylinder member.

BRIEF DESCRIPTION OF THE DRAWINGS

FIG. 11 is an exploded view showing the elements of a third preferred embodiment of the present invention.

FIG. 12 is a cross sectional drawing of the cylinder member of the present invention as shown in FIG. 11.

FIG. 13 is a cross sectional drawing of the magnetic conductor of the present invention as shown in FIG. 11.

DETAILED DESCRIPTION

Figure 2:
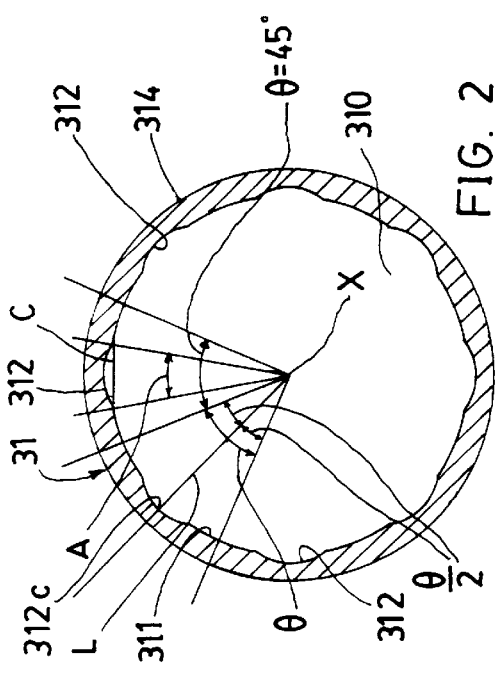
FIG. 2 is a cross sectional drawing of the cylinder member of the present invention.
Figure 3:
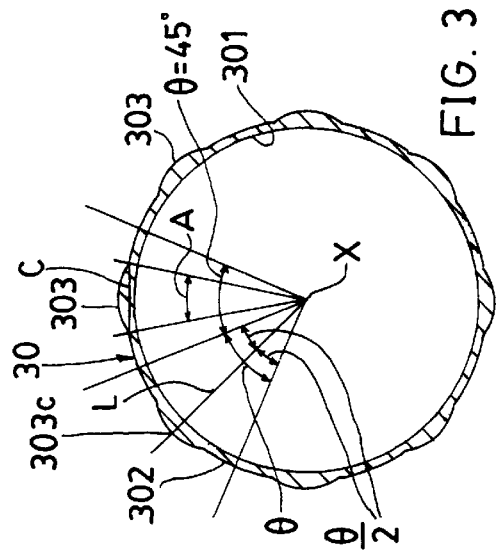
FIG. 3 is a cross section al drawing of the magnetic conductor of the present invention.
Figure 1:
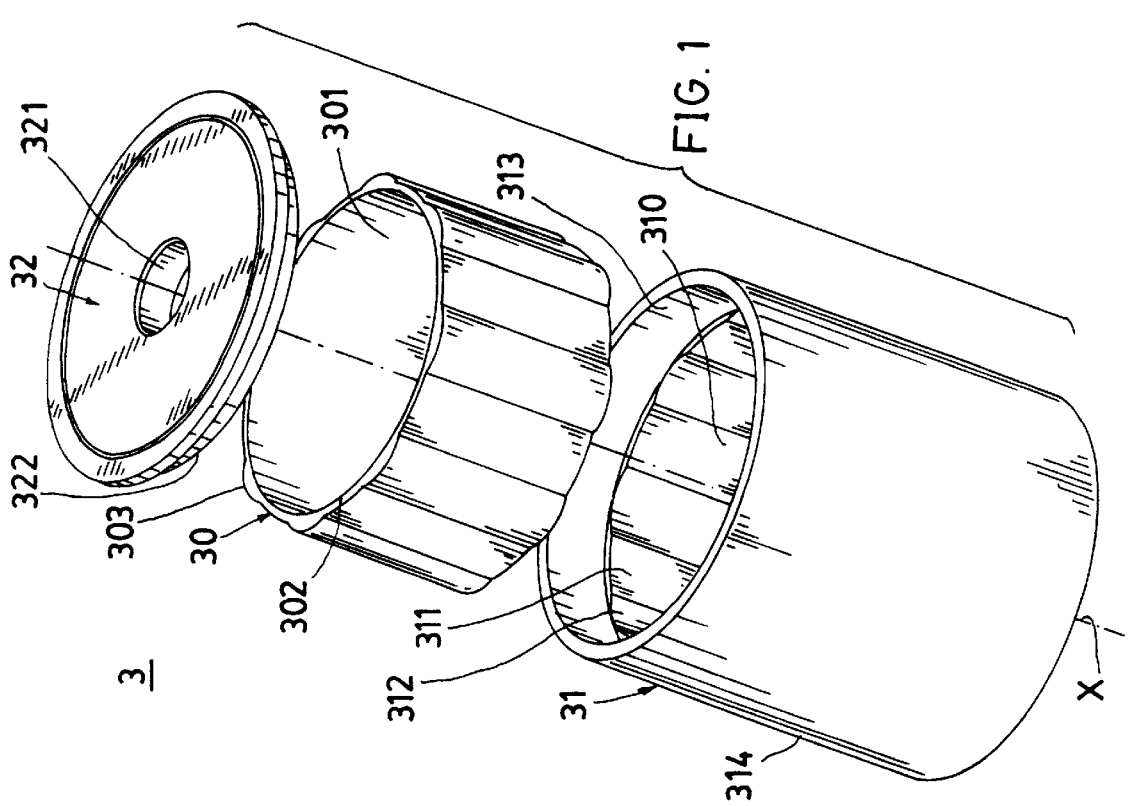
FIG. 1 is an exploded view showing the elements of a first preferred embodiment of the present invention.

As shown in FIGS. 1~5, the outer rotor means 3 of an outer-rotor type electric motor of the present invention comprises: a cylinder member 31, a magnetic conductor 30 annularly secured to an inside wall in the cylinder member 31 and an end plate 32 secured to an end portion of the cylinder member 31. The magnetic conductor 30 may be a magnet or formed from other magnetically conductive materials.

The cylinder member 31 includes: an inside wall 311 defining a cylindrical inner hole 310 about an axis X longitudinally formed at a center of the outer rotor means 3, a plurality of recesses 312 radially and equally-spaced recessed in the inside wall 311, ad an outside wall 314 opposite to the inside wall 311 formed on an outside surface of the cylinder member 31.

The magnetic conductor 30 is generally formed as an annular ring and includes a plurality of magnetic poles (N or S poles) radially formed on the conductor 30, each magnetic pole corresponding to a magnetic-pole central angle θ. If the number of the magnetic poles is "n", each magnetic-pole central angle θ will be 360°/n. Accordingly, if there are eight magnetic poles radially formed in the magnetic conductor 30, each magnetic-pole central angle θ will be obtained as: θ=360°/8=45°. Each central angle has an arc length equally divided along a perimeter of the inside wall of the inner hole 301.

Figure 4:
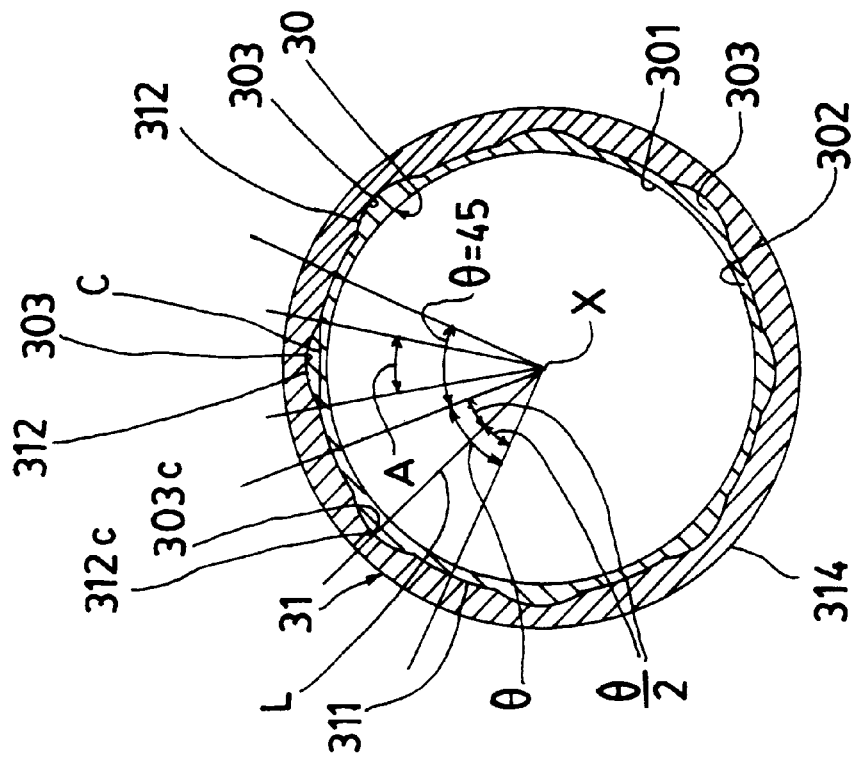
FIG. 4 is a cross sectional drawing of the magnetic conductor coupled with the cylinder member in accordance with the present invention.
Figure 7:
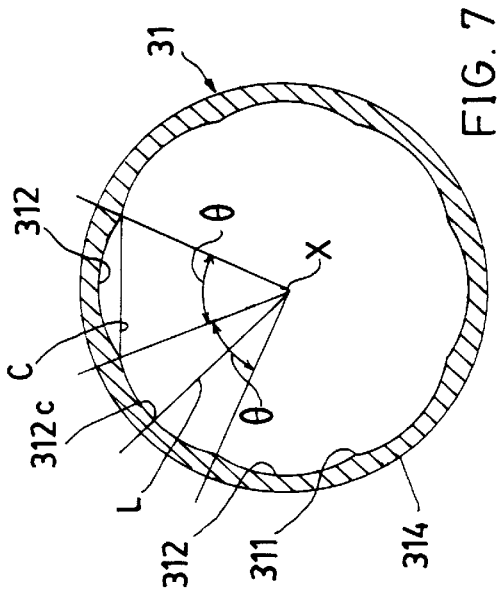
FIG. 7 is a cross sectional drawing of the cylinder member of the present invention as shown in FIG. 6.
Figure 8:
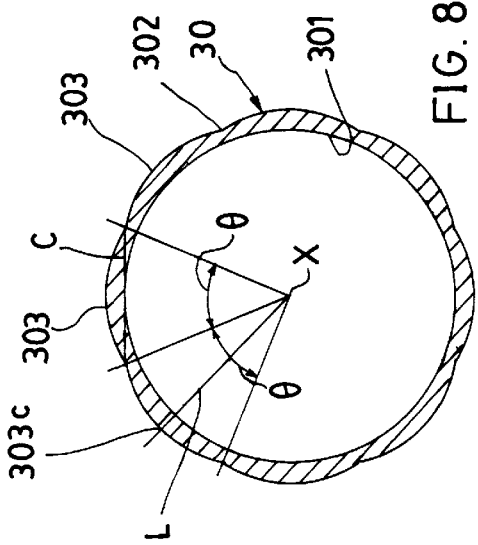
FIG. 8 is a cross sectional drawing of the magnetic conductor of the present invention as shown in FIG. 6.
Figure 6:
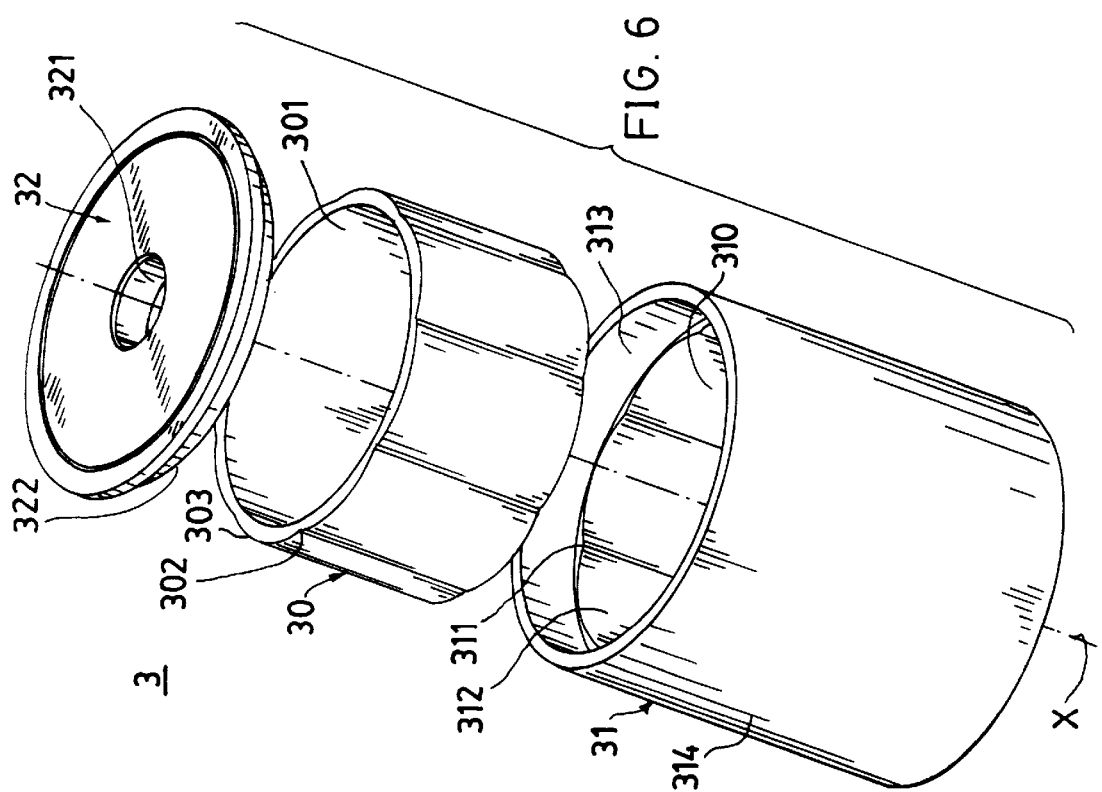
FIG. 6 is an exploded view showing the elements of a second preferred embodiment of the present invention.

Each recess 312 recessed in the cylinder member 31 has a chord C defining a central angle A about the axis X as shown in FIGS. 2, 4, with the central angle A being smaller than the magnetic-pole central angle θ, namely, A<θ (FIGS. 1~5).

The magnetic conductor 30 is formed with an inner hole 301 cylindrically shaped and rotatably circumferentially disposed about an inner stator (not shown) about the axis X; and a plurality of protrusions 303 radially protruding outwardly from an outer peripheral surface 302 of the conductor 30 opposite to the inner hole 301 and equally spaced along the outer peripheral surface 302 of the conductor 30; with the outer peripheral surface 302 engageable with the inside wall 311 of the cylinder member 31; and each protrusion 303 of the magnetic conductor 30 engageable with each recess 312 in the cylinder member 31.

Each protrusion 303 is formed as an arcuate protrusion radially protruding outwardly from the magnetic conductor 30, having a chord C defined on an arc of each said protrusion 303 equal to the chord C defined on an arc of each said recess 312 in said cylinder member 31. Each protrusion 303 or its chord C defines a central angle A between the chord C and the axis X. Such a central angle A of the magnetic conductor 30 is equal to the central angle A of each recess 312 formed in the cylinder member 31. The central angle A of each protrusion 303 or recess 312 is smaller than the magnetic-pole central angle θ defined by each magnetic pole in the magnetic conductor 30 (FIGS. 1~5).

Each protrusion 303 has an apex 303c located at a top center convex upwardly from the outer peripheral surface 302 of the magnetic conductor 30, with the apex 303c coinciding with a central line L dividing each magnetic-pole central angle θ into two half magnetic-pole central angles (2×θ/2).

Each recess 312 has a valley center (or a lowest point) 312c located at a center of each recess 312 radially recessed in the cylinder member 31, with each valley center 312c of each recess 312 of the cylinder member 31 engageably matching with each apex 303c of each protrusion 303 of the magnetic conductor 30 and coinciding with a central line L dividing each magnetic-pole central angle θ into two half magnetic-pole central angles (2×θ/2), especially as shown in FIG. 4.

The number, dimensions, and shapes of the recesses 312 or the protrusions 303 are not limited in the present invention.

Figure 5:
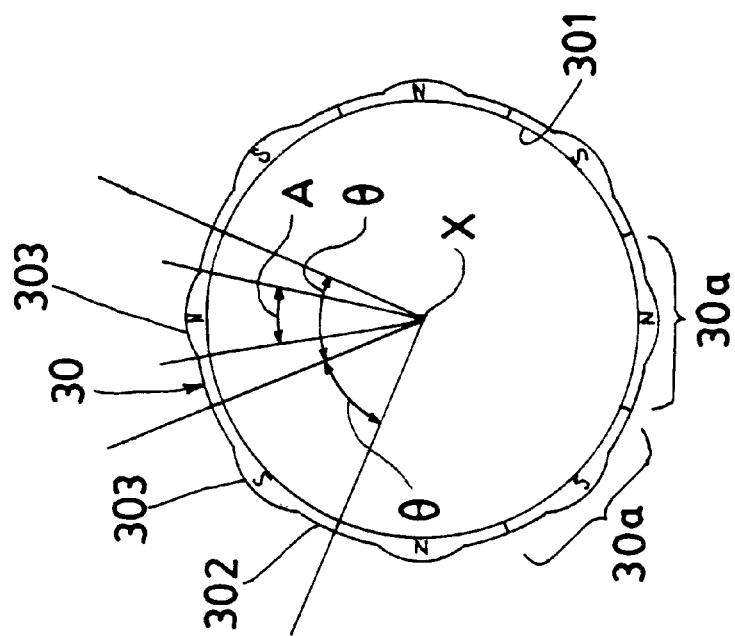
FIG. 5 is a cross sectional drawing of the magnetic conductor by annularly connecting a plurality of magnet units in accordance with the present invention.

The magnetic conductor 30 may be integrally formed as an annular magnet or magnetic conductor. Or, there are a plurality of arcuate magnet units 30a radially divided about the axis X and annularly connected with one another to form an annular ring of magnetic conductor 30 as shown in FIG. 5; each arcuate magnet unit 30a corresponding to a magnetic pole (N or S pole), and every two neighboring magnet units 30a having magnetic poles differing each other (for instance, N, S, N. S . . . ).

Due to the engagement of each convex protrusion 303 of the magnetic conductor 30 with each concave recess 312 of the cylinder member 31, the magnetic conductor 30 will be steadily stably secured to the cylinder member 31 to prevent from loosening or separation of the magnetic conductor 30 from the cylinder member 31, thereby being suitable for use in an electric motor of outer rotor type having a high torque and high speed rotation of the motor. The magnetic conductor 30 and the cylinder member 31 may be well connected by adhesive bonding, soldering or any other joining methods for further enhancing their firm connection.

The end plate 32 includes: a central neck (or hub) portion 321 for connecting a driving shaft or for coupling an axle (not shown), and a short cylindrical extension 322 concentrically formed on a rim portion of an inside wall of the end plate 32 to be engaged with a cylindrical hole 313 formed in an end portion of the cylinder member 31 for securing the end plate 32 on the cylinder member 31 by welding or rivetting or other joining methods. The cylinder member 31 may be formed with a transmission device (not shown) for outputting a kinetic force of the motor directly from the cylinder member 31. Or, the kinetic force of the motor is output through the shaft axially secured to the central neck portion 321 of the end plate 32 which is fixed on the cylinder member 31.

Figure 10:
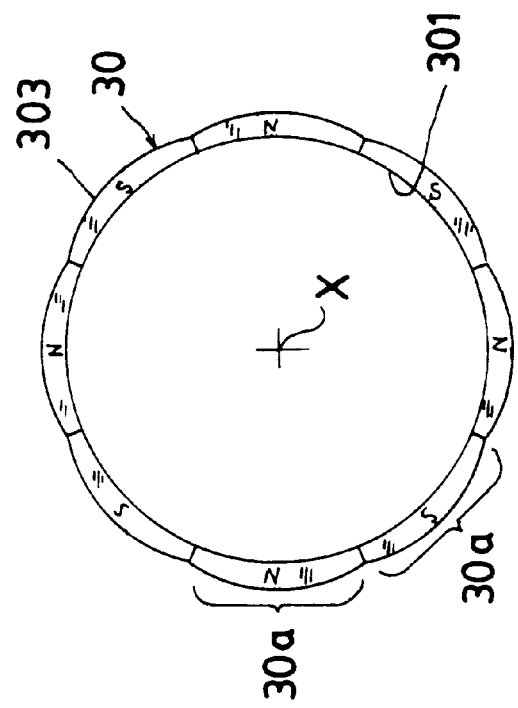
FIG. 10 is a cross sectional drawing of the magnetic conductor by annularly connecting a plurality of magnet units in accordance with the present invention as shown in FIG. 6.
Figure 9:
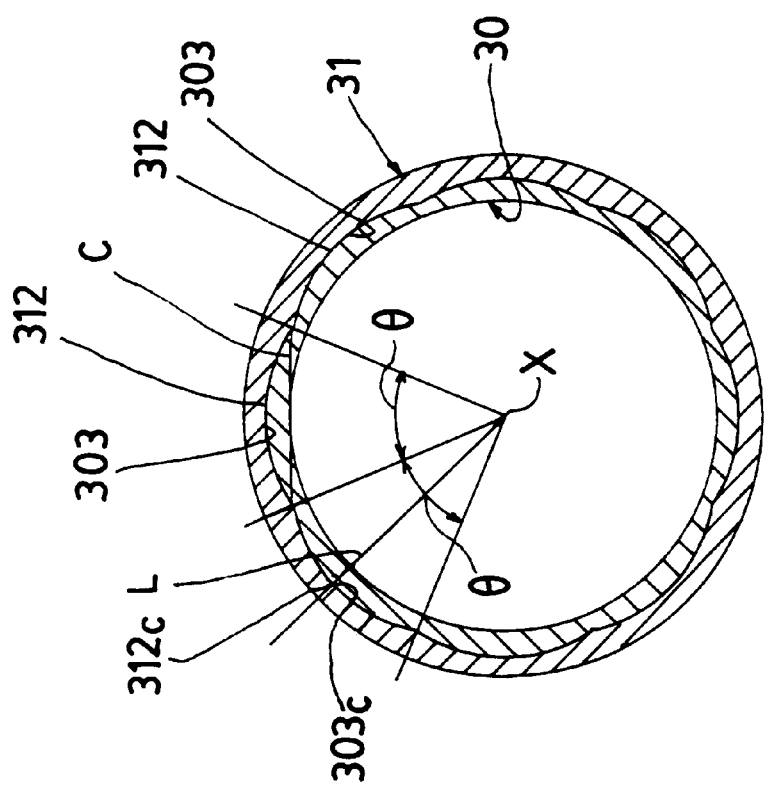
FIG. 9 is a cross sectional drawing of the magnetic conductor coupled with the cylinder member in accordance with the present invention as shown in FIG. 6.
Figure 15:
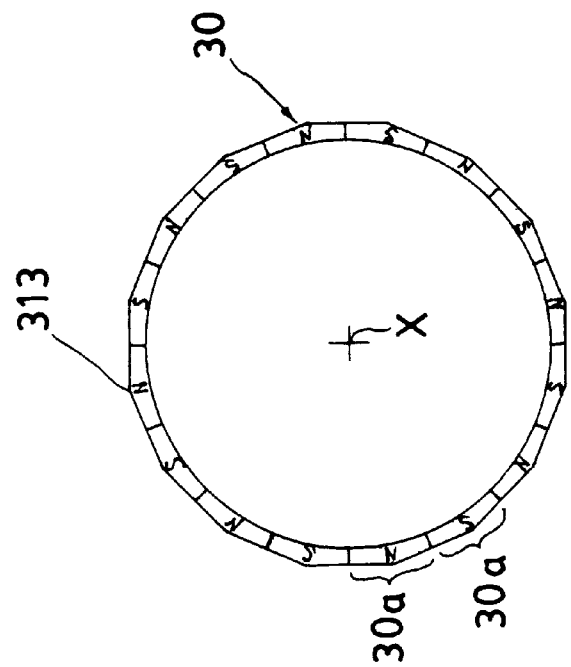
FIG. 15 is a cross sectional drawing of the magnetic conductor by annularly connecting a plurality of magnet units in accordance with the present invention as shown in FIG. 11.
Figure 14:
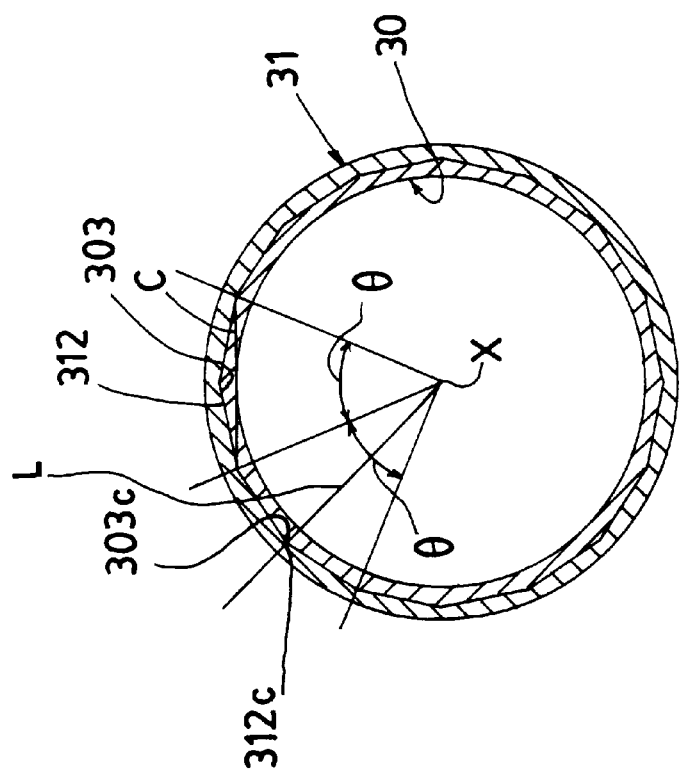
FIG. 14 is a cross sectional drawing of the magnetic conductor coupled with the cylinder member in accordance with the present invention as shown in FIG. 11.
Figure 16:
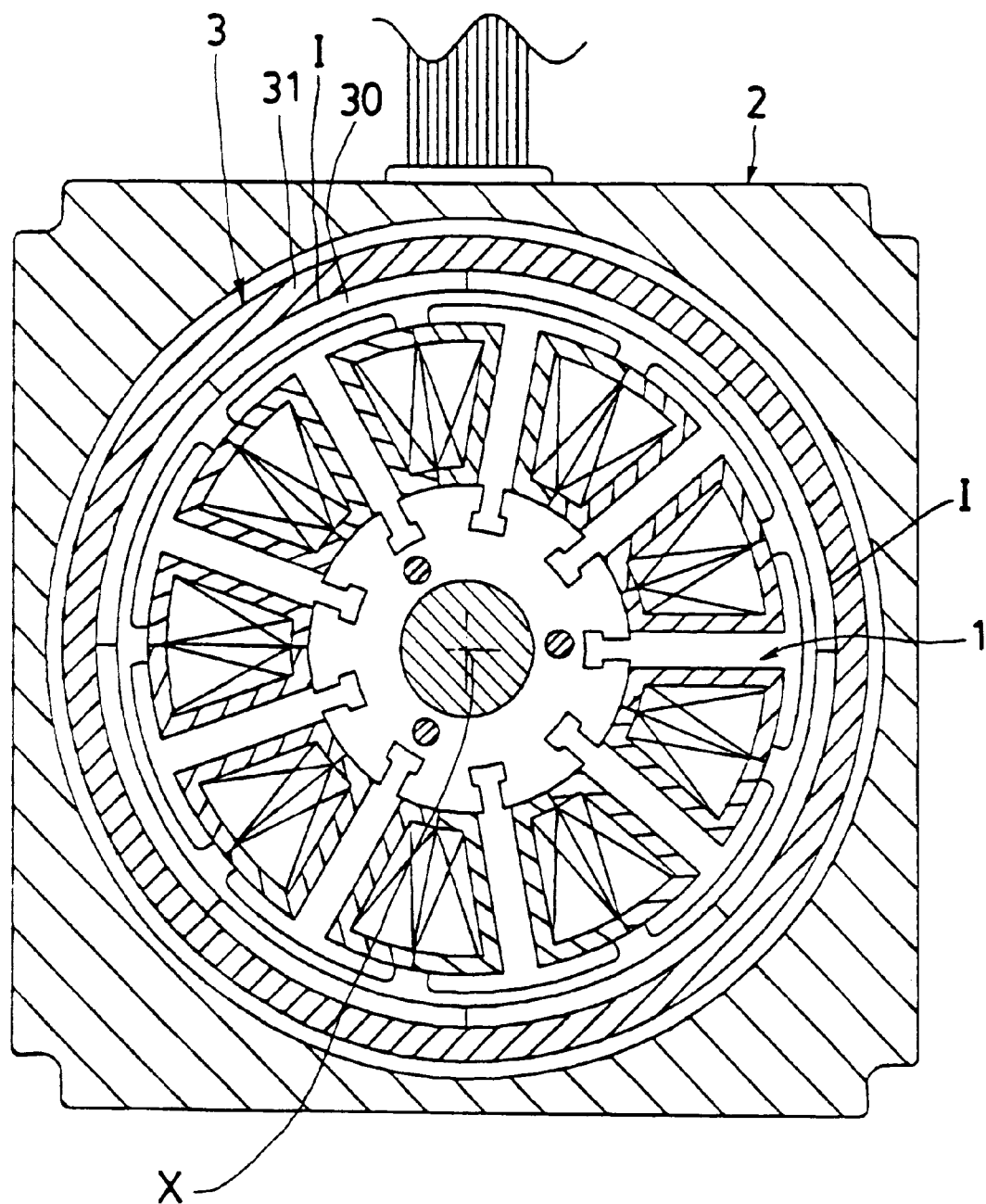
FIG. 16 is a cross sectional drawing of the outer-rotor type motor of the prior art.

As shown in FIGS. 6~10, each protrusion 303 and each recess 312 respectively has a chord C defining a central angle, which is equal to each magnetic-pole central angle θ, about the axis X. By the way, the number of the protrusions 303 (or the number of the recesses 312) is equal to the number of magnetic poles of the magnetic conductor 30 in this preferred embodiment. The magnetic conductor 30 may be integrally formed, or may be annularly formed by joining a plurality of magnet units 30a as shown in FIG. 10.

As shown in FIGS. 11~15, each recess 312 is modified to be an angular recess, particularly a triangular recess having a base length or chord C, and each protrusion 303 is modified to be an angular protrusion, particularly a triangular protrusion having a base length or chord C, with each said triangular protrusion 303 engageable with each said triangular recess 312 for firmly coupling the magnetic conductor 30 in the cylinder member 31. The apex 303c of the protrusion 303 is also engageably matching with the valley center (or lowest point) 312c of the recess 312. The central angle defined by the chord C of each triangular protrusion 303 or recess 312 is equal to each magnetic-pole central angle θ.

Although each central angle A of each protrusion 303 of the magnetic conductor 30 or each recess 312 of the cylinder member 31 may be equal to or small than each magnetic-pole central angle θ as aforementioned. However, the degrees of the central angle A of each protrusion 303 or recess 312 are not limited in this invention.

The present invention may be modified without departing from the spirit and scope of the present invention.

The outer rotor of the present invention may interact with an inner stator (not shown) to cause rotation of the outer rotor due to armature reaction between the inner stator and the outer rotor for outputing work of the motor, which is so conventional and not described in detail in this invention.

I claim:

1. An outer rotor means, adapted for an outer-rotor electric motor, comprising:

a cylinder member (31) having a plurality of recesses (312) radially recessed in an inside wall of said cylinder member (31);

a magnetic conductor (30) concentrically secured in said cylinder member (31), and having an inner hole (301) rotatably engageable with an inner stator about an axis (X), and having a plurality of protrusions (303) radially protruding outwardly from an outer peripheral surface (302) of said magnetic conductor (30), with each said protrusion (303) engaged with each said recess (312) for firmly coupling said magnetic conductor (30) in said cylinder member (31) for preventing loosening of said magnetic conductor (30) from said cylinder member (31) when rotated; and an end plate (32) secured to an end portion of said cylinder member (31);

said magnetic conductor (30) formed as an annular magnet ring having a plurality of magnetic poles radially divided in the annular magnet ring about the axis (X), each magnetic pole corresponding to a magnetic-pole central angle (θ), whereby when the number of said magnetic poles in said magnetic conductor (30) is designated as n, each said magnetic-pole central angle (θ) is obtained as: 360°/n; each said recess (312) formed as an arcuate recess (312) in said cylinder member (31) having a chord (C) across the arcuate recess (312) defining a central angle (A) between the chord (C) and the axis (X); and each said protrusion (303) formed as an arcuate protrusion (303) on said magnetic conductor (30) having a chord (C), the same as the chord (C) of said arcuate recess (312), across the arcuate protrusion (303) defining said central angle (A) between said chord (C) and said axis (X).

2. An outer rotor means according to claim 1, wherein each said protrusion (303) has an apex (303c) formed at a top center of said protrusion (303) coinciding with a central line (L) dividing each said magnetic-pole central angle (θ) into two half magnetic-pole central angles (2×θ/2); and each said recess (312) has a valley center (312c) formed at a center of said recess (312) and engageably matching with the apex (303c) of said protrusion (303).

3. An outer rotor means according to claim 1, wherein each said central angle (A) is smaller than each said magnetic-pole central angle (θ).

4. An outer rotor means according to claim 1, wherein each said central angle (A) is equal to each said magnetic-pole central angle (θ).

5. An outer rotor means according to claim 1, wherein each said central angle (A) is larger than each said magnetic-pole central angle (θ).

6. An outer rotor means according to claim 1, wherein said magnetic conductor (30) is integrally formed as an annular ring.

7. An outer rotor means according to claim 1, wherein said magnetic conductor (30) is annularly formed by connecting a plurality of arcuate magnet units (30a) which are annularly arranged in a ring formation, each said magnet unit (30a) corresponding to a magnetic pole; every two neighboring magnet units (30a) having magnetic poles differing from each other.

8. An outer rotor means, adapted for an outer-rotor electric motor, comprising:
   a cylinder member (31) having a plurality of recesses (312) radially recessed in an inside wall of said cylinder member (31);
   a magnetic conductor (30) concentrically secured in said cylinder member (31), and having an inner hole (301) rotatably engageable with an inner stator about an axis (X), and having a plurality of protrusions (303) radially protruding outwardly from an outer peripheral surface (302) of said magnetic conductor (30), with each said protrusion (303) engaged with each said recess (312) for firmly coupling said magnetic conductor (30) in said cylinder member (31) for preventing loosening of said magnetic conductor (30) from said cylinder member (31) when rotated; and
   an end plate (32) secured to an end portion of said cylinder member (31);
   said magnetic conductor (30) formed as an annular magnet ring having a plurality of magnetic poles radially divided in the annular magnet ring about the axis (X), each magnetic pole corresponding to a magnetic-pole central angle (θ); each said recess (312) formed as an angular recess (312) in said cylinder member (31) having a chord (C) across the angular recess (312) defining a central angle (A) between the chord (C) and the axis (X); and each said protrusion (303) formed as an angular protrusion (303) on said magnetic conductor (30) having a chord (C), the same as the chord (C) of said angular recess (312), across the angular protrusion (303) defining said central angle (A) between said chord (C) and said axis (X).

9. An outer rotor means according to claim 8, wherein each said angular recess (312) is a triangular recess; and each said angular protrusion (303) is a triangular protrusion of said magnetic conductor (30) having each magnetic pole defining a magnetic-pole central angle (θ).

10. An outer rotor means according to claim 9, wherein each said triangular protrusion (303) has an apex (303c) formed at a top center of said protrusion (303) coinciding with a central line (L) dividing each said magnetic-pole central angle (θ) into two half magnetic-pole central angles (2×θ/2); and each said triangular recess (312) has a lowest point (312c) formed at a center of said recess (312) and engageably matching with the apex (303c) of said triangular protrusion (303).

11. An outer rotor means according to claim 8, wherein each said central angle (A) is smaller than each said magnetic-pole central angle (θ).

12. An outer rotor means according to claim 8, wherein each said central angle (A) is equal to each said magnetic-pole central angle (θ).

13. An outer rotor means according to claim 8, wherein each said central angle (A) is larger than each said magnetic-pole central angle (θ).

14. An outer rotor means according to claim 8, wherein said magnetic conductor (30) is integrally formed as an annular ring.

15. An outer rotor means according to claim 8, wherein said magnetic conductor (30) is annularly formed by connecting a plurality of angular magnet units (30a) which are annularly arranged in a ring formation, each said magnet unit (30a) corresponding to a magnetic pole; every two neighboring magnet units (30a) having magnetic poles differing each other.

* * * * *